United States Patent
Bao et al.

(10) Patent No.: US 6,938,262 B2
(45) Date of Patent: Aug. 30, 2005

(54) DUAL DATA REPRESENTATION

(75) Inventors: Mingyan Bao, Timnath, CO (US); Cheryl Herndon, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 486 days.

(21) Appl. No.: 09/948,781

(22) Filed: Sep. 10, 2001

(65) Prior Publication Data

US 2003/0051065 A1 Mar. 13, 2003

(51) Int. Cl.$^7$ ................................................. G06F 9/00
(52) U.S. Cl. ........................ 719/329; 719/319; 707/101; 707/200
(58) Field of Search ........................... 707/101, 103 R, 707/103 Y, 200; 719/319, 329

(56) References Cited

U.S. PATENT DOCUMENTS

| | | | |
|---|---|---|---|
| 5,506,580 A | 4/1996 | Whiting et al. ............... 341/51 |
| 6,008,808 A | 12/1999 | Almeida et al. ............. 345/339 |
| 6,014,670 A | * 1/2000 | Zamanian et al. ........... 707/101 |
| 6,061,701 A | 5/2000 | Hirai et al. .................. 707/536 |
| 6,513,072 B1 | * 1/2003 | Williamson et al. ......... 719/315 |
| 6,643,635 B2 | * 11/2003 | Nwabueze ..................... 707/2 |

* cited by examiner

Primary Examiner—Sue Lao
Assistant Examiner—Andy Ho

(57) ABSTRACT

In a computer software application involving object calculations using numbers or symbols assigned to an object, multiple physical objects may be defined and grouped logically. The method for DDR provides easier display of data to a user and calculation with the data, by representing and maintaining attributes of a physical object in two formats (raw data and display data) coherently, conveniently, and consistently throughout a software application. The DDR may be accomplished through logically grouping and storing the raw data and the corresponding display data in a same instance of a data structure. The method for DDR may be implemented using a computer programming language, such as C or other types of programming language. Preferable, the method for DDR may be used in connection with most compiled languages that support the use of data structures and type definitions.

20 Claims, 3 Drawing Sheets

DUAL DATA REPRESENTATION

TECHNICAL FIELD

The technical field relates to computer software applications, and, in particular, to dual data representation for software applications.

BACKGROUND

A user typically interacts with a computer software application through a user interface, i.e., a front end of the application. A back end refers to portions of the application that are hidden from the user and not shown on the user interface. When the user enters a command on the user interface, the front end typically records the user's instructions and passes that information to the back end. The back end then performs all the operations according to the user's instructions and supplies the front end with data to be displayed on the user interface.

Currently, an application typically stores only raw data, which are simple machine readable data with limited descriptions. Display data that are more descriptive and intended for users are typically derived from the back end of the application whenever needed. Since an application may involve retrieving and displaying the same set of raw data multiple times from different places in the application, the derivation process may need to be performed repeatedly for the same set of data, resulting in redundant coding throughout the application. With duplicated code in the application, application size may be increased and more work may be involved to maintain the code. Consequently, the application performance may be slowed down. In addition, the display data derived from the same set of raw data may be inconsistently formatted.

SUMMARY

A method for dual data representation (DDR) for an application includes retrieving a set of raw data for an object and storing the set of raw data in an instance of a data structure, which may contain multiple fields. The data structure typically organizes and logically groups the set of raw data before storing the set of raw data. The method further includes translating the set of raw data into a set of corresponding display data that is more descriptive than the set of raw data and storing the set of corresponding display data in the same instance of the data structure as the set of raw data. The method enables the set of raw data and the set of corresponding display data of the object to be maintained coherently and consistently throughout the application, thereby providing easier display of data to the user and calculation with the data.

By grouping and storing the raw data and the corresponding display data in the same data structure, the method for DDR creates fewer interfaces between a front end and a back end of the application, resulting in a more streamlined application. In addition, the method maintains and presents the display data in a consistent format throughout the software application, creating a more user-friendly interface.

DESCRIPTION OF THE DRAWINGS

The preferred embodiments of the method for dual data representation will be described in detail with reference to the following figures, in which like numerals refer to like elements, and wherein.

DETAILED DESCRIPTION

Computer software applications typically have two types of data, raw data and display data. The raw data are simple machine-readable data that are not intended for users to see. For example, the raw data for dimension measurements may be 0.75 for length, 3.5 for width, and 5 for height. The display data typically add units or formatting to the raw data so that the data is easier for the users to read and understand. For example, the display data for the above dimension measurements may be 0.75 centimeters for length, 3.5 centimeters for width, and 5 meters for height. For weight measurements, the display data may have units such as grams, kilograms, and pounds.

Dual data representation (DDR) is a method for representing data in dual format so that the data is both machine-readable (raw data) and human-readable (display data). The method for DDR provides easier display of data to the user and calculation with the data, by representing and maintaining attributes of a physical object in two formats (raw data and display data) coherently, conveniently, and consistently throughout a software application.

In a computer software application involving calculations using numbers or symbols assigned to an object, multiple physical objects may be defined and grouped logically. For example, measurements of length, width, and height for one object may be grouped separately from measurements of another object. The method for DDR may group both raw data and corresponding display data for one object together in a same data structure. Data structure stands for various methods of organizing data as records in a computer. For example, in programming languages, simple data types may be characters or integers. A data structure may be defined to include different fields representing different simple data types so as to organize the data in a logical way. As an example, a first field of the data structure may be a character type and a second field may be integer type. Populating the fields with data may generate instances, and each instance of the data structure may contain a different set of data values that are of the same type. From the previous example, a first instance of the data structure may contain data for one object and a second instance may contain data for another object.

The DDR may be accomplished through logically grouping and storing the raw data and the corresponding display data in the same instance of a data structure. The method for DDR may be implemented using a computer programming language, such as C or other types of programming language. Preferable, the method for DDR may be used in connection with most compiled languages that support the use of data structures and type definitions, which is a method of naming a data structure.

Figure 1:
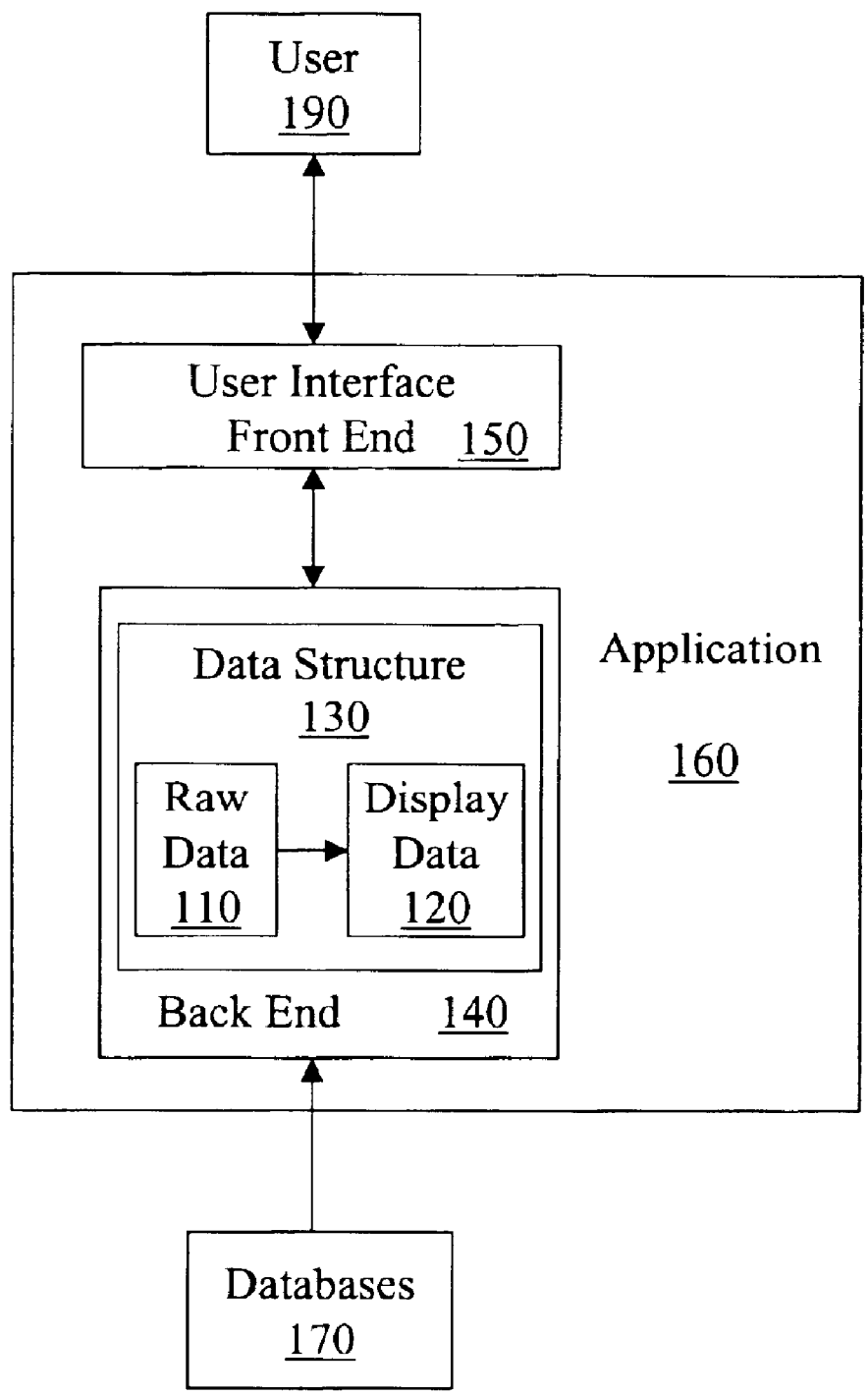
FIG. 1 illustrates an exemplary software application with a data structure capable of storing raw data and display data.

FIG. 1 illustrates an exemplary software application 160 with a data structure 130 capable of storing both raw data 110 and corresponding display data 120. The data structure 130 may need to be designed to be part of the application 160 by a software engineer. The data structure 130 is typically located in a back end 140 of the application 160.

After the method for DDR retrieves the raw data 110 for an object from databases, hardware objects, or other types of data storage devices 170, the method may group the raw data 110 into logical groupings according to common attributes of the raw data 110, and store the raw data 110 in an instance of the data structure 130. Next, the method for DDR may manipulate and translate the raw data 110 into corresponding display data 120 with strings that are human-readable. The corresponding display data 120 may be stored in the same instance of the data structure 130 as the raw data 110. Finally, the method for DDR may provide access to the display data 120 in the data structure 130 to a front end 150 of the application, where the display data 120 may be presented to human users 190.

Tables 1–3 provide an example of generating instances from different fields of a data structure 130. Referring to Table 1, in a "Geometrical_Block" data structure 130, a raw data field contains smaller fields of length, width, and height, which are defined as type integer. A display data field contains smaller fields of surface_area and volume, which are defined as type string.

TABLE 1

Data Structure: Geometrical_Block

Raw Data:

int Length;
int Width;
int Height;
Display Data:

String Surface_Area
String Volume

Referring to Tables 2 and 3, after the fields of the data structure 130 are populated with data, instance 1 (Cube 1) and instance 2 (Cube 2) may be generated. The numbers for length, width, and height are arbitrary. Volume and surface area are derived from formulas: Volume=W×L×H, whereas surface area=W×L×6, given that the objects being defined are cubes.

TABLE 2

Instance 1: Cube 1

Raw Data:

Length: 3
Width: 3
Height: 3
Display Data:

Surface Area: 54 cm$^2$
Volume: 27 cm$^3$

TABLE 3

Instance 2: Cube 2

Raw Data:

Length: 4
Width: 4
Height: 4
Display Data:

Surface Area: 96 cm$^2$
Volume: 64 cm$^3$

By grouping and storing the raw data 110 and the display data 120 in the same data structure 130, the display data 120 may not need to be derived from the back end 140 each time the data is requested by a user 190, because a single software function may be used to encapsulate the process to derive the display data. Consequently, the method for DDR creates fewer interfaces between the front end 150 and the back end 140 of the application 160, and reduces the number of functions the front end 150 needs to know or perform to access the display data 120. The application 160 is thus more streamlined, accompanied with decreased application size and increased application performance. With less coding involved in the application 160, easier code maintenance may be warranted. In addition, grouping and storing the raw data 110 and corresponding display data 120 in the same data structure 130 helps to maintain and provide display data 120 in a consistent format throughout the software application 160, creating a more user-friendly interface.

Software functions may be written to populate the data structure 130 using raw data 110 in the application, to manipulate and translate the raw data 110 into the corresponding display data 120, and to store the corresponding display data 120 in the same instance of the data structure 130 as the raw data 110. Programming languages such as the C language may be used to manipulate and translate the raw data 110 into the display data 120. Data translation and manipulation is described, for example, in U.S. Pat. No. 6,008,808, issued on Dec. 28, 1999 to Almeida et al., entitled "Tools for Data Manipulation and Visualization," which is incorporated herein by reference. Almeida et al. disclose data manipulation and visualization tools for organizing, managing and navigating through complex data.

Table 4 provides another example of a software application 160 that needs to represent and display different geometrical physical objects to a user 190. The geometrical objects may have attributes such as height, width, length, color, density, material, and texture. The data structure 130 may be stored and operated in the back end 140 of the application 160. Different geometrical objects may be represented in the data structure 130 logically, where one instance of the data structure 130 relates to one geometrical object.

TABLE 4

Shape_Data_Type:

Raw_data:

Int height, width, length, weight;
Color_t color;
Density_t density;
Material_t material;
Texture_t texture;
Display_data:

String Dimension;   /* format: "WxLxH cm" */
String Color;       /* format: "Mauve: xxxrgb" or "Lilac:xxxrgb", etc . . . */
String Volume;      /* format: "V cc" */
String Weight;      /* format: "W kg" */

As shown in Table 4, each geometrical object may contain a raw data 110 and a corresponding display data 120. The raw data 110 enable quick and easy calculations and other manipulations of the data in the back end 140 of the application 160. The raw data 110 may be manipulated to generate the corresponding display data 120, which is displayed to the user 190 on the user interface 150. The corresponding display data 120 enable easy display of the object attributes to the user 190 in a human-readable format. Both types of data may be stored in a same instance of the data structure 130 for coherency and easy access. A function such as "get_shape_information" may provide a populated "Shape_Data_Type" structure so that the display data 120 may be translated from the raw data 110 in only one place in the application 160, i.e., the "get_shape_information" function.

Figure 2:
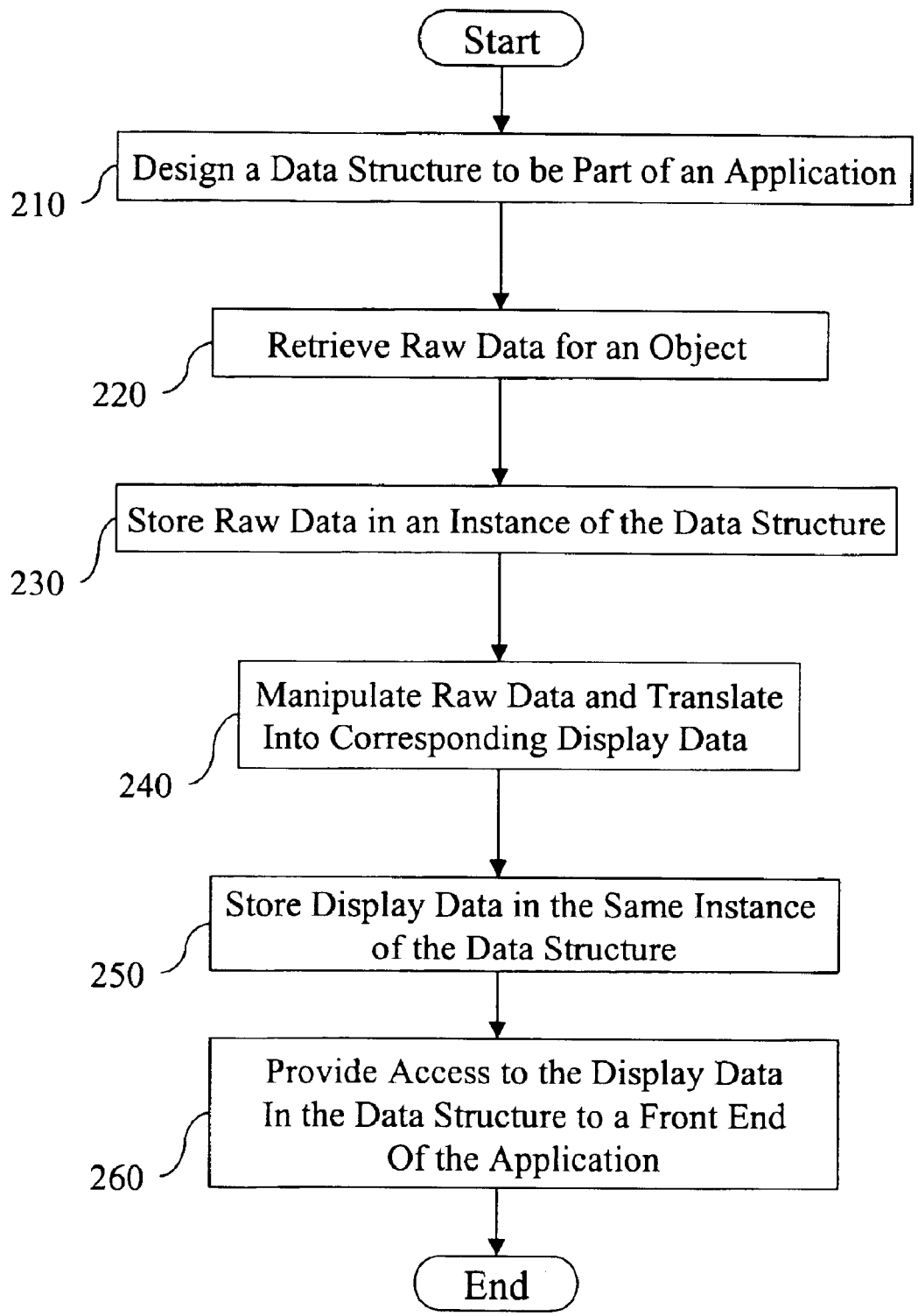
FIG. 2 is a flow chart illustrating an exemplary method for dual data representation.

FIG. 2 is a flow chart illustrating an exemplary method for dual data representation. First, a data structure 130 may be designed to be part of a software application 160, step 210. Then, the method retrieves and gathers raw data 110 for an object, step 220. Next, the raw data 110 may be stored inside an instance of a data structure 130 capable of storing physical objects, step 230. The raw data 110 may then be manipulated and translated into corresponding display data 120, step 240, which is stored in the same instance of the data structure 130 for display, step 250. Finally, the method provides access to the display data 120 in the data structure 130 to a front end 150 of the application 160, so that users 190 may access the display data 120, step 260.

Figure 3:
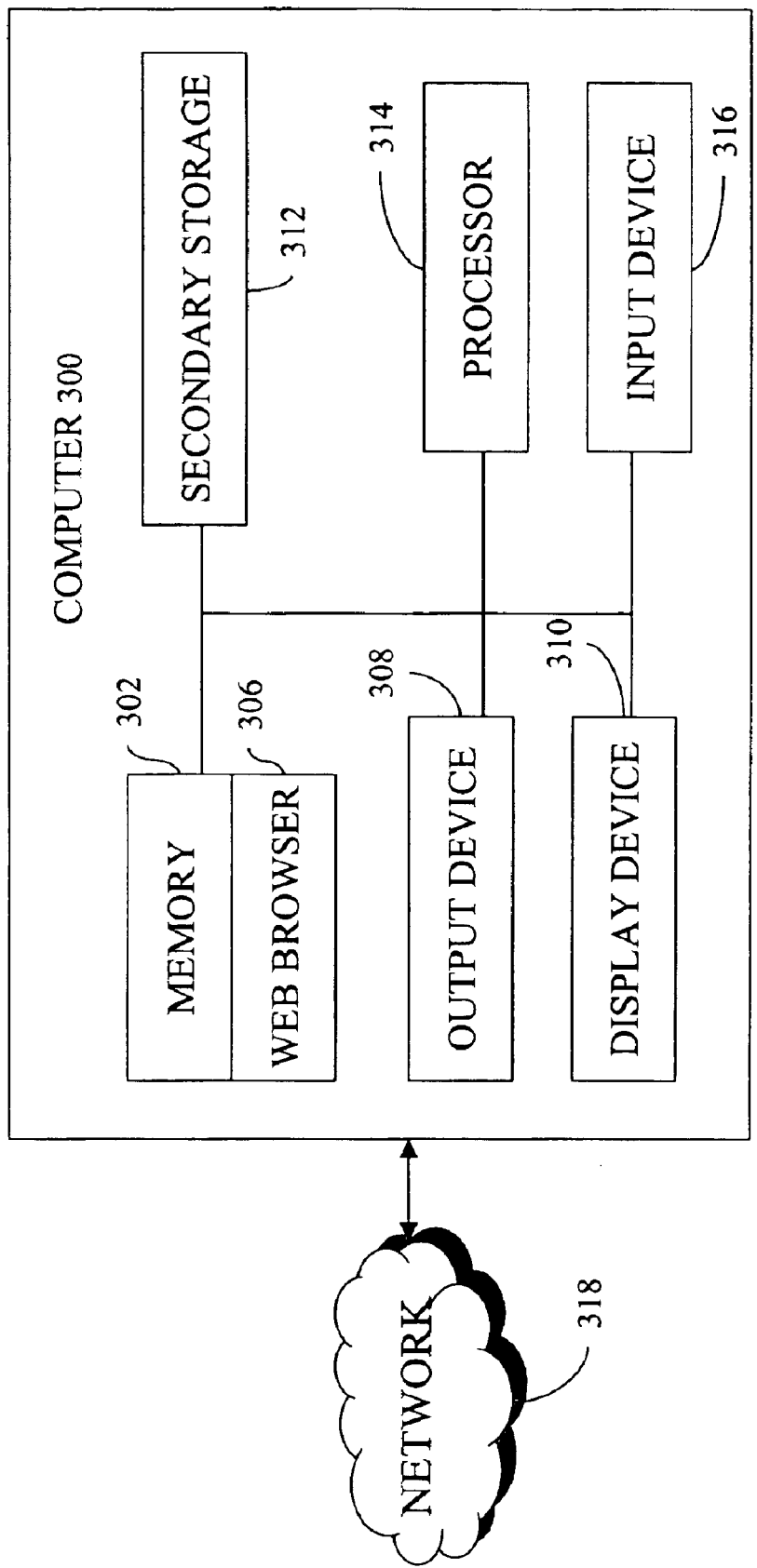
FIG. 3 illustrates exemplary hardware components of a computer that may be used in connection with the exemplary method for dual data representation of FIG. 2.

FIG. 3 illustrates exemplary hardware components of a computer 300 that may be used in connection with the exemplary method for DDR. The computer 300 includes a connection with a network 318 such as the Internet or other type of computer or telephone networks. The computer 300 typically includes a memory 302, a secondary storage device 312, a processor 314, an input device 316, a display device 310, and an output device 308.

The memory 302 may include random access memory (RAM) or similar types of memory. The computer 300 may be connected to the network 318 by a web browser 306. The web browser 306 makes a connection by way of the World Wide Web (WWW) to other computers, and receives information from the other computers that is displayed on the computer 300. Information displayed on the computer 300 is typically organized into pages that are constructed using specialized language, such as HTML or XML. The secondary storage device 312 may include a hard disk drive, floppy disk drive, CD-ROM drive, or other types of non-volatile data storage, and may correspond with various databases or other resources. The processor 314 may execute information stored in the memory 302, the secondary storage 312, or information received from the Internet or other network 318. The input device 316 may include any device for entering data into the computer 300, such as a keyboard, keypad, cursor-control device, touch-screen (possibly with a stylus), or microphone. The display device 310 may include any type of device for presenting visual image, such as, for example, a computer monitor, flat-screen display, or display panel. The output device 308 may include any type of device for presenting data in hard copy format, such as a printer, and other types of output devices including speakers or any device for providing data in audio form. The computer 300 can possibly include multiple input devices, output devices, and display devices.

Although the computer 300 is depicted with various components, one skilled in the art will appreciate that the computer 300 can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling the computer 300 to perform a particular method.

While the method and apparatus for dual data representation have been described in connection with an exemplary embodiment, those skilled in the art will understand that many modifications in light of these teachings are possible, and this application is intended to cover any variation thereof.

What is claimed is:

1. A computer implemented method for dual data representation (DDR) for an application, comprising:

retrieving a set of raw data for an object, wherein the raw data is machine-readable binary data and describes a physical object for a software application;

storing the set of raw data in an instance of a data structure, wherein the data structure contains multiple fields capable of receiving data to generate multiple instances, and wherein the data structure organizes and logically groups the set of raw data;

translating the set of raw data into a set of corresponding display data, wherein the set of corresponding display data is more descriptive than the set of raw data and includes strings that are human-readable; and storing the set of corresponding display data in the same instance of the data structure as the set of raw data, wherein the display data has a direct relation to the physical object that the raw data describes, whereby the set of raw data and the set of corresponding display data of the object are maintained coherently and consistently throughout the application.

2. The method of claim 1, further comprising providing access to the set of corresponding display data in the data structure from a front end of the application.

3. The method of claim 1, further comprising designing and populating the data structure through a software function.

4. The method of claim 1, wherein the storing step includes storing the set of raw data in a back end of the application.

5. The method of claim 1, wherein the translating step includes translating the set of raw data using a compiled programming language.

6. A user interface implemented by a computer that provides dual data representation (DDR) for an application, comprising:

a back end of the application that stores a data structure, wherein the data structure contains multiple fields capable of receiving data to generate multiple instances, and wherein each instance of the data structure comprises:

a set of raw data for an object, wherein the raw data is machine-readable binary data and describes a physical object for a software application; and a set of corresponding display data translated from the set of raw data, wherein the display data includes strings that are human-readable, wherein the data structure organizes and logically groups the set of raw data and the set of corresponding display data to be stored in the same instance; and a front end of the application that displays the set of corresponding display data to a use, wherein the display data has a direct relation to the physical object that the raw data describes.

7. The user interface of claim 6, wherein the set of raw data and the set of corresponding display data of the object are maintained coherently and consistently throughout the application.

8. The user interface of claim 6, wherein the data structure is designed and populated through a software function.

9. The user interface of claim 6, wherein the set of raw data and the set of corresponding display data are grouped according to common attributes of the object.

10. The user interface of claim 6, wherein the set of raw data is translated into the set of corresponding display data using a compiled programming language.

11. A computer readable medium providing instructions for dual data representation (DDR), the instructions comprising:
    retrieving a set of raw data for an object, wherein the raw data is machine-readable binary data and describes a physical object for a software application;
    storing the set of raw data in an instance of a data structure, wherein the data structure contains multiple fields capable of receiving data to generate multiple instances, and wherein the data structure organizes and logically groups the set of raw data;
    translating the set of raw data into a set of corresponding display data, wherein the set of corresponding display data is more descriptive than the set of raw data and includes strings that are human-readable; and
    storing the set of corresponding display data in the same instance of the data structure as the set of raw data, wherein the display data has a direct relation to the physical object that the raw data describes,
    whereby the set of raw data and the set of corresponding display data of the object are maintained coherently and consistently throughout the application.

12. The computer readable medium of claim 11, further comprising instructions for providing access to the set of corresponding display data in the data structure from a front end of the application.

13. The computer readable medium of claim 11, wherein the instructions for storing include instructions for storing the set of raw data in a back end of the application.

14. The computer readable medium of claim 11, wherein the instructions for translating include instructions for translating the set of raw data using a compiled programming language.

15. The method of claim 1, wherein the raw data describes a geometrical physical object.

16. The method of claim 1, further comprising using a single software function to encapsulate a process of deriving the display data from the raw data.

17. The user interface of claim 6, wherein the raw data describes a geometrical physical object.

18. The user interface of claim 6, further comprising a single software function that encapsulates a process of deriving the display data from the raw data.

19. The computer readable medium of claim 11, wherein the raw data describes a geometrical physical object.

20. The computer readable medium of claim 11, further comprising instructions for using a single software function to encapsulate a process of deriving the display data from the raw data.

* * * * *